United States Patent [19]

Comer et al.

[11] 3,903,174
[45] Sept. 2, 1975

[54] ANTIFUNGAL DIENEOIC ALCOHOLS

[75] Inventors: William T. Comer; James W. Rayburn; Davis L. Temple, all of Evansville, Ind.

[73] Assignee: Mead Johnson & Company, Evansville, Ind.

[22] Filed: Oct. 21, 1974

[21] Appl. No.: 516,303

Related U.S. Application Data

[60] Division of Ser. No. 300,942, Oct. 26, 1972, Pat. No. 3,853,949, which is a continuation-in-part of Ser. No. 246,309, April 21, 1972, abandoned.

[52] U.S. Cl. ............................................. 260/617 R
[51] Int. Cl.$^2$ ......................................... C07C 27/00
[58] Field of Search .............................. 260/617 R

[56] References Cited
UNITED STATES PATENTS 2,597,843   5/1952   Linn .............................. 260/617 R
3,214,459   10/1965  Miller ............................ 260/468

OTHER PUBLICATIONS

V. N. Belov et al., Chem. Abst., Vol. 62, No. 3946h, (1965), (Zh. Obshoh Khim 34(10), 3432–3435, (1965).

*Primary Examiner*—Bernard Helfin
*Assistant Examiner*—James H. Reamer
*Attorney, Agent, or Firm*—Robert H. Uloth; Robert E. Carnahan

[57] ABSTRACT

Dieneoic acid δ-methylene-1-cyclopentene-1-pentanoic acid is obtained by reacting cyclopentanone with one chemical equivalent of methylsulfinylmethide alkali metal salt in dimethylsulfoxide. Lithium aluminum hydride reduction of the acid provides ε-methylene-1-cyclopentene-1-pentanol. The acid, metal salts thereof, lower alkyl esters, and the alcohol are effective antifungal agents.

2 Claims, No Drawings

ANTIFUNGAL DIENEOIC ALCOHOLS

CROSS-REFERENCE TO RELATED APPLICATIONS

This application is a division of co-pending U.S. application Ser. No. 300,942, filed Oct. 26, 1972 now U.S. Pat. No. 3,853,949, which is a continuation-in-part of then co-pending application Ser. No. 246,309, filed April 21, 1972, now abandoned.

BACKGROUND OF THE INVENTION

This invention is concerned with carbon compounds and in particular olefinic carboxylic acids and a process for making same. It is further concerned with alkyl ester derivatives of the olefinic acids and alkali metal salts thereof.

The compounds of the present invention are antifungal agents.

SUMMARY OF THE INVENTION

This invention relates to new diene carboxylic acids of Formula I and to a process for their preparation. The invention further relates to esters and non-toxic pharmaceutically acceptable metal salts of the acids of Formula I and to alcohols of Formula II obtained by reduction of the acid. These substances are useful as antifungal agents.

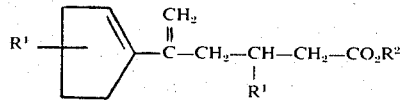

FORMULA I

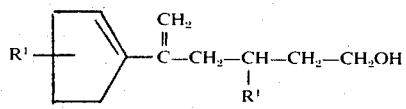

FORMULA II

In the above formulas, $R^1$ signifies hydrogen or methyl with the proviso that whenever $R^1$ is methyl the $R^1$-cyclopentenyl radical is selected from the group consisting of 3-methyl-1-cyclopentenyl and 4-methyl-1-cyclopentenyl; and $R^2$ represents hydrogen or lower alkyl. By the term "lower alkyl" it is meant that the carbon chains which comprise this group include both straight and branch chain carbon radicals of from 1 to 4 carbon radicals of from 1 to 4 carbon atoms inclusive such as methyl, ethyl, propyl, isopropyl, 1-butyl, 1-methylpropyl, 2-methylpropyl, and tert.-butyl.

It will be apparent to those skilled in the art that both geometrical and optical stereoisomeric forms of the compounds of Formula I wherein $R^1$ is methyl are possible, and it is to be understood that this invention comprehends all forms thereof.

Diene acids of Formula I wherein $R^2$ is hydrogen and $R^1$ is as above are obtained in accord with the process of the present invention by reacting a member of the group consisting of cyclopentanone, 3-methylcyclopentanone, and 2-cyclopentylidene cyclopentanone, with one chemical equivalent of a methylsulfinylmethide alkali metal salt such as sodium methylsulfinylmethide, potassium methylsulfinylmethide or lithium methylsulfinylmethide in excess dimethyl sulfoxide. The reaction is preferably carried out with one chemical equivalent of sodium methylsulfinylmethide to that of the ketone at 0°–25°C. For purposes of recovery, the reaction mixture is quenched in a water immiscible organic solvent such as methylene chloride or ether or mixtures thereof to promote precipitation of the carboxylic acid alkali metal salt. The carboxylic acid is isolated by dissolving the salt in water, neutralizing with acid, and extracting with an organic solvent such as ether. Evaporation of the solvent provides the acid which is purified by conventional techniques such as distillation and crystallization.

The fact that the diene acids of the present invention are obtained according to the above method by reaction of a cyclopentanone or the 2-cyclopentylidene cyclopentanone products with methylsulfinyl carbanion in dimethylsulfoxide is surprising and highly unexpected. For instance, E. J. Corey, et al., *J. Am. Chem. Soc.*, 84, 866 (1962), 87, 1345 (1965), report that under similar conditions cyclohexanone and cycloheptanone yield only corresponding enolate anions or beta-hydroxysulfoxide products. The reaction of methylsulfinyl carbanion with a cycloalkyl ketone in dimethylsulfoxide to provide diene carboxylic acids is believed to be quite specific in nature and limited to cyclopentanone and its 3-alkyl substituent. Reaction of 2-methylcyclopentanone with dimethylsulfoxide provides the corresponding dienoic acid in trace amounts. Cycloalkyl ketones such as cyclobutanone, 2,5-dimethylcyclopentanone, and 3,4-dimethylcyclopentanone do not give diene carboxylic acids analogous to those of Formula I under the conditions of the procedure described herein.

Alkali metal salts of the diene carboxylic acids of Formula I can be obtained directly by utilizing the appropriate alkali metal methylsulfinyl carbanion. Other metal salts can be prepared by neutralizing the free acid with bases of metalic cations. By way of example, there can be mentioned such salts as the sodium, potassium, lithium, aluminum, copper, and zinc salts of δ-methylene-1-cyclopentene-1-pentanoic acid.

The lower alkyl esters of the present invention are obtained by reacting the diene carboxylic acid with N,N'-carbonyldiimidazole and the appropriate alcohol under basic catalysis. Esters can also be obtained by reacting the diene carboxylic acid with an excess of the alcohol in ether solvent employing a catalytic amount of perchloric acid at 25°C.

Reduction of the dienoic acids with lithium aluminum hydride provides the corresponding alcohols of Formula II.

The compounds of Formulas I and II possess good antifungal properties which can be readily demonstrated by the disc-plate method. According to this well-known method, Sabouraud dextrose agar is inoculated with suspensions of various pathogenic dermatophytes and related fungi and the inoculated agar allowed to solidify in sterile petri dishes. A solution of the test agent is added to filter paper discs and the discs placed on the agar surface of the plate. The plates are then incubated at 30°C. and zones of inhibition are measured for various drug concentrations and compared with standard reference agents such as undecylinic acid. The lowest culture is determined by varying the drug concentration and is designated as the minimal inhibitory concentration (MIC). The following table is illustrative of the MIC values obtained for δ-methylene-1-cyclopentene-1-pentanoic acid and the ethyl ester thereof compared to undecylenic acid.

TABLE I

IN VITRO ANTIFUNGAL ACTIVITY

| Undecylenic Acid | Minimum Inhibitory Concentration (mcg./ml.) |
|---|---|
| Microsporum audouini ATCC 9079 | 12.5 |
| Microsporum canis ATCC 10241 | 25 |
| Trichophyton mentagrophytes (gypseum) ATCC 9129 | 12.5 |
| Trichophyton mentagrophytes (interdigitale) ATCC 9972 | 50 |
| Trichophyton mentagrophytes (asteroides) ATCC 8757 | 25 |
| Candida albicans ATCC 10231 | >100 |
| δ-Methylene-1-cyclopentene-1-pentanoic Acid | |
| Microsporum audouini ATCC 9079 | 25 |
| Microsporum canis ATCC 10241 | 25 |
| Trichophyton mentagrophytes (gypseum) ATCC 9129 | 25 |
| Trichophyton mentagrophytes (interdigitale) ATCC 9972 | 25 |
| Trichophyton mentagrophytes (asteroides) ATCC 8757 | 25 |
| Candida albicans ATCC 10231 | >100 |
| Ethyl δ-methylene-1-cyclopentene-1-pentanoate | |
| Microsporum audouini ATCC 9079 | 25 |
| Microsporum canis ATCC 10241 | 50 |
| Trichophyton mentagrophytes (gypseum) ATCC 9129 | 25 |
| Trichophyton mentagrophytes (interdigitale) ATCC 9972 | 50 |
| Trichophyton mentagrophytes (asteroides) ATCC 8757 | 25 |
| Candida albicans ATCC 10231 | >100 |

In the treatment of fungal infections in mammals, the compounds of the present invention are administered topically in accordance with conventional procedures for topical antifungal administration. Dosage unit forms containing an effective non-toxic amount of the compounds identified by Formulas I and II can be combined with suitable physiologically acceptable carriers. Various forms of topical pharmaceutical preparations may be used including solutions, tinctures, creams, ointments, powders, soaps, and aerosols. In ointments, the preferred concentration of the compounds identified by Formulas I and II ranged from 1 to 20%.

The compounds of the present invention are relatively non-toxic compounds. In mice, for instance, δ-methylene-1-cyclopentene-1-pentanoic acid and ethyl δ-methylene-1-cyclopentene-1-pentanoate have an $ALD_{50}$ of greater than 2,000 mg./kg. body weight upon oral administration.

The following examples are given by way of illustration and are not to be construed as limitations of this invention.

EXAMPLE 1

δ-Methylene-1-cyclopentene-1-pentanoic acid

Sodium methylsulfinyl carbanion is prepared under nitrogen by adding a 57% mineral oil dispersion of sodium hydride (54.0 g., 1.28 mole) to 250 ml. of dry dimethyl sulfoxide with stirring and then slowly increasing the temperature of the suspension to 71°C. where it is maintained until hydrogen is no longer evolved. The gray mixture of sodium methylsulfinyl carbanion is then immediately cooled to 25°C. and cyclopentanone (100.0 g., 1.19 mole) added dropwise thereto. The reaction of cyclopentanone with the carbanion is slightly exothermic and is moderated in an ice bath for 0.5 hr. The reaction mixture is stirred at 25°C. for an additional 5 hr. period, poured into 2.1 of chilled 1:1 methylene chloride-ether in an ice bath, refrigerated overnight, and the finely divided precipitated product is collected and washed with 9:1 ether-methylene chloride. Air drying provides 197 g. of the sodium salt of δ-methylene-1-cyclopentene-1-pentanoic acid (62.8 g., 59%) as an orange oil which solidifies on standing. Purification of the acid is carried out by conversion to its sodium salt, followed by neutralization to provide analytically pure δ-methylene-1-cyclopentene-1-pentanoic acid as white crystals M.P. 43.5°–56.5°C. (corr.); ultraviolet absorption spectrum in ethanol exhibits a single band at 237 nm (ε max 16,300).

Analysis. Calcd. (percent) for $C_{11}H_{16}O_2$: C, 73.30; H, 8.95. Found (percent): C, 73.20; H, 8.83.

NMR δ (ppm) ($CDCl_3$, tetramethylsilane ref.): 1.88 [m, 6H, $(CH_2)_3$], 2.38 [m, 6H, $(CH_2C=)_3$], 4.98 (s, 2H, $=CH_2$), 5.87 (s, 1H, $=CH$), 9.12 (s, 1H, $CO_2H$).

Infrared (pelleted with K Br): 1720 cm.$^{-1}$ (C=O), 1620 cm.$^{-1}$ (C=C), 1580 cm.$^{-1}$ (C=C).

EXAMPLE 2

Ethyl δ-methylene-1-cyclopentene-1-pentanoate

N,N'-Carbonyldiimidazole (11.3 g., 0.07 mole) is added in small portions to δ-methylene-1-cyclopentene-1-pentanoic acid (11.6 g., 0.065 mole) in 50 ml. dry tetrahydrofuran. After carbon dioxide evolution has ceased, 50 ml. of absolute ethanol containing a catalytic amount of sodium ethoxide is added, the mixture stirred at room temperature for 2 hr. and then most of the solvent evaporated under reduced pressure. The residue thus obtained is dissolved in ether, washed with water, and cold solutions of 1 N. NaOH and 1 N. HCl. Drying the ethereal extract over a magnesium sulfate and evaporating in vacuo provides 13.5 g. (100%) of the ester as a yellow oil. Distillation of the yellow oil yields analytically pure ethyl δ-methylene-1-cyclopentene-1-pentanoate as a pale yellow oil having a boiling point of 71°C. at 0.2 mm Hg $n_D^{26}$ 1.484; infrared film exhibits carbonyl absorption at 1740 cm.$^{-1}$.

Analysis. Calcd. (percent) for $C_{15}H_{20}O_2$: C, 74.96; H, 9.68. Found (percent): C, 74.88; H, 9.77.

NMR δ (ppm) ($CDCl_3$, tetramethylsilane ref.), 1.24 (t, 3H, $CH_3$), 1.88[m, 6H, $(CH_2)_3$], 2.38[m, 6H, $(CH_2=)_3$], 4.13 (8, 2H, $CH_2CH_3$), 4.98 (s, 2H, $=CH_2$), 5.87 (s, 1H, $=CH$).

Infrared (film) 1730 cm.$^{-1}$ (C=O), 1620 cm.$^{-1}$ (C=C), 1590 cm.$^{-1}$ (C=C).

By substitution of ethanol in the above procedure with an equimolar weight of isopropyl alcohol, n-butyl alcohol, or tert.-butyl alcohol with catalytic amounts of the sodium salts thereof, there is produced respectively:

isopropyl δ-methylene-1-cyclopentene-1-pentanoate,
n-butyl δ-methylene-1-cyclopentene-1-pentanoate,
tert.-butyl δ-methylene-1-cyclopentene-1-pentanoate.

EXAMPLE 3

Reaction of 3-methylcyclopentanone with sodium methylsulfinyl carbanion

By substituting an equimolar weight of 3-methylcyclopentanone in the procedure of Example 1 for cyclopentanone, there is produced an isomeric mixture of δ-methylene-1-cyclopentene-1-pentanoate along with a substantial amount of 3-methylglutaric acid. Esterification of this mixture of acids according to the procedure of Example 2 produces the corresponding ethyl esters. Purification is carried out by fractional distillation through a 6 inch Vigreaux column to provide first the side-product diethyl 3-methylglutarate, b.p. 82°C. at 0.2 mm Hg., and then the ester fraction having a boiling point of 116°C. at 0.3 mm Hg., $n_D^{23}$ 1.3074. According to vapor phase chromatographic analysis and nmr spectral data, the ester product consists of an equal mixture of both isomers of ethyl β-methyl-δ-methylene-1-(3-methylcyclopentene)-1-pentanoate and ethyl β-methyl-δ-methylene-1-(4-methylcyclopentene)-1-pentanoate illustrated by Formula III and Formula IV respectively.

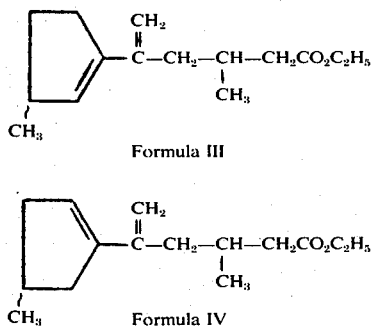

Analysis. Calcd. for $C_{15}H_{24}O_2$ (percent): C, 76.22; H, 10.24. Found (percent): C, 76.20; H, 10.20.

EXAMPLE 4

Reaction of 2-cyclopentylidene cyclopentanone with sodium methylsulfinyl carbanion 2-Cyclopentylidene cyclopentanone (6.4 g., 0.043 mole) obtained according to the method of French, et al., J. Am. Chem. Soc., 71, 3702 (1949) is added in the manner of the procedure of Example 1 to sodium methylsulfinyl carbanion obtained from 1.94 g. of a 53% mineral oil of dispersion of sodium hydride in dimethyl sulfoxide. There is thus obtained 5.6 g., of the sodium salt of δ-methylene-1-cyclopentene-1-pentanoic acid which, if desired, can further be neutralized to provide the free acid in a 26% yield.

By substitution of 2-cyclopentylidene cyclopentanone in the above procedure with an equimolar weight of 2-(3-methylcyclopentylidene)-3-methylcyclopentanone there is produced β-methyl-δ-methylene-1-(3-methylcyclopentene)-1-pentanoic acid and β-methyl-δ-methylene-1-(4-methylcyclopentene)-1-pentanoic acid.

EXAMPLE 5

ε-Methylene-1-cyclopentene-1-pentanol

δ-Methylene-1-cyclopentene-1-pentanoic acid (60.3 g., 0.336 mole) in 100 ml. of dry tetrahydrofuran is added to lithium aluminum hydride (25.5 g., 0.672 mole) in 500 ml. of dry tetrahydrofuran under nitrogen with cooling at 0°C. The mixture is refluxed with stirring 4 hrs., cooled to 0°C. and decomposed by sequential addition of 25 ml. water in 50 ml. tetrahydrofuran, 25 ml. 15% sodium hydroxide, and 75 ml. water and filtered. The filtrate dried over magnesium sulfate and concentrated under reduced pressure provides 50.9 g. (91% yield) of pure product according to nmr data. The product can be distilled with considerable polymerization, and has a boiling point of 82°C. at 0.1 mm Hg.

Analysis. Calcd. for $C_{11}H_{18}O$ (percent): C, 79,46; H, 10.91. Found (percent): C, 79.30; H, 10.96.

NMR δ (ppm) (CDCl₃, tetramethylsilane ref.): 5.77 (s, 1H, =CH); 4.90 (S, 2H, =CH₂); 3.63 (t, 2H, CH₂OH).

The in vitro antifungal activity of ε-methylene-1-cyclopentene-1-pentanol by the disc-plate method is as follows:

| Test Organism | Minimum Inhibitory Concentration (mcg./ml.) |
|---|---|
| *Microsporum audouini* ATCC 9079 | 50 |
| *Microsporum canis* ATCC 10241 | 50 |
| *Trichophyton mentagrophytes* (gypseum) ATCC 9129 | 50 |
| *Trichophyton mentagrophytes* (interdigitale) ATCC 9972 | 50 |
| *Trichophyton mentagrophytes* (asteroides) ATCC 8757 | 50 |
| *Candida albicans* ATCC 10231 | >100 |

By substitution of β-methyl-δ-methylene-1-(3-methylcyclopentene)-1-pentanoic acid or β-methyl-δ-methylene-1-(4-methylcyclopentene)-1-pentanoic acid for δ-methylene-1-cyclopentene-1-pentanoic acid in the above procedure there is obtained respectfully β-methyl-δ-methylene-1-(3-methylcyclopentene)-1-pentanol and β-methyl-δ-methylene-1-(4-methylcyclopentene)-1-pentanol.

While several specific embodiments are disclosed in the foregoing specification, it will be appreciated that other modifications may be made without departing from the spirit and scope of the appended claims.

What is claimed is:

1. A compound selected from the group consisting of diene alcohols of the formula

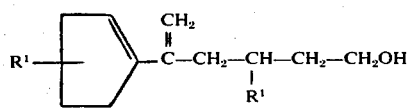

wherein R¹ is hydrogen or methyl with the proviso that whenever R¹ is methyl the R¹-cyclopentenyl radical is selected from the group consisting of 3-methyl-1-cyclopentenyl and 4-methyl-1-cyclopentenyl.

2. The compound according to claim 1 which is ε-methylene-1-cyclopentene-1-pentanol.

* * * * *